United States Patent
Jahagirdar (10) Patent No.: US 12,131,169 B2
(45) Date of Patent: Oct. 29, 2024

(54) SYSTEMS AND METHODS FOR PROVIDING AN AUTOMATICALLY TAILORED USER EXPERIENCE

(71) Applicant: Truist Bank, Charlotte, NC (US)

(72) Inventor: Prasad Prabhakarrao Jahagirdar, Fort Mill, SC (US)

(73) Assignee: TRUIST BANK, Charlotte, NC (US)

( * ) Notice: Subject to any disclaimer, the term of this patent is extended or adjusted under 35 U.S.C. 154(b) by 0 days.

(21) Appl. No.: 18/162,147

(22) Filed: Jan. 31, 2023

(65) Prior Publication Data

US 2024/0256307 A1  Aug. 1, 2024

(51) Int. Cl.
*G06F 3/0481* (2022.01)
*G06F 9/451* (2018.01)

(52) U.S. Cl.
CPC ............ *G06F 9/452* (2018.02); *G06F 3/0481* (2013.01)

(58) Field of Classification Search
CPC ..... G06F 9/452; G06F 3/0481; G06Q 20/108; G06Q 20/12
See application file for complete search history.

(56) References Cited

U.S. PATENT DOCUMENTS

| 10,510,082 B1 * | 12/2019 | Zimmerman | ........ G06Q 20/108 |
| 10,970,778 B1 * | 4/2021 | Starbuck | ................ G06Q 40/02 |
| 2008/0046349 A1 * | 2/2008 | Elberg | .................. G06Q 40/02 705/35 |
| 2017/0078259 A1 * | 3/2017 | Kumar | .................... H04L 67/59 |

OTHER PUBLICATIONS

Lianru Liu et al., An Implementation of the online-payment Platform based on Saas, Aug. 1, 2010, IEEE 2nd Symposium on Web Society, pp. 658-662 (Year: 2010).*
Catalin M. Popa et al., Mobile banking: Deploying and consuming web services, Nov. 1, 2010, 9th International Symposium on Electronics and Telecommunications, pp. 177-182 (Year: 2010).*

* cited by examiner

*Primary Examiner* — Tam T Tran
(74) *Attorney, Agent, or Firm* — Michael A. Springs, Esq.; Shumaker, Loop & Kendrick, LLP; Patrick B. Horne (57) ABSTRACT

A system is disclosed for dynamically assigning a predetermined user experience displayed in a graphical user interface based on one or more parameters associated with user login information that includes identifying information associated with a user and based on the type of interaction a user has requested to initiate. The system receives the user login information and automatically determines whether to display a first format or a second format in a first window within the graphical user interface based on the identifying information associated with the user. While the first window is displaying either the first format or the second format, the system may receive a request to initiate an interaction. Based on determining whether the interaction is a first type or a second type, the system automatically displays a second window in either the first format or the second format based on the type of interaction requested.

20 Claims, 3 Drawing Sheets

SYSTEMS AND METHODS FOR PROVIDING AN AUTOMATICALLY TAILORED USER EXPERIENCE

FIELD

This invention relates generally to the field of tailored user experience, and more particularly, embodiments of the invention relate to tailoring a user experience based on the user's prior connections.

BACKGROUND

When a company merges with or acquires another company or entity, changes are necessary to integrate the previous systems into a harmonious system easily maneuverable by all parties, including customers and employees. Often times, if a user has become accustomed to a particular website or mobile device application, any change in their experience may cause them to seek an new alternative that will suit their needs in the format they prefer. Accordingly, a need exists for systems and methods for allowing a system to be tailored to a particular user based on their prior relationship with either entity.

BRIEF SUMMARY

Embodiments of the present invention address the above needs and/or achieve other advantages by providing systems and methods to ensure users remain content with their user experience and are able to easily navigate the system without having to learn a new system.

Embodiments of the invention include a computer-implemented method for dynamically assigning a predetermined user experience displayed in a graphical user interface, the method includes receiving user login information from a user, the login information including identifying information associated with the user; automatically ascertaining whether to display a first format or a second format within a graphical user interface based on the identifying information associated with the user; displaying a first window in at least one of the first format and the second format within the graphical user interface on a computing device; receiving, via the graphical user interface, a user selection of a request to initiate an interaction; determining, by a processor, whether the interaction is a first type of interaction or a second type of interaction; and automatically displaying, based on the determined type of interaction, a second window in at least one of the first format and the second format within the graphical user interface.

According to example embodiments of the invention, a system is disclosed for dynamically assigning a pre-selected user experience displayed in a graphical user interface. The system includes at least one processor, a communication interface communicatively coupled to the at least one processor, and a memory device storing executable code that, when executed, causes the processor to receive user login information from a user, the login information including identifying information associated with the user. The system then automatically ascertains whether to display a first format or a second format within a graphical user interface based on the identifying information associated with the user. The system displays a first window in at least one of the first format and the second format within the graphical user interface on a computing device. Via the graphical user interface, the system receives a user selection of a request to initiate an interaction. Through a processor, the system determines whether the interaction is a first type of interaction or a second type of interaction and then automatically displays, based on the determined type of interaction, a second window in at least one of the first format and the second format within the graphical user interface.

Embodiments of the invention include a user device for dynamically assigning a predetermined user experience displayed in a graphical user interface, the user device including at least one processor, a communication interface communicatively coupled to the at least one processor, and a memory device storing executable code that, when executed, causes the processor to initiate display of a graphical user interface having at least one of a first format associated with a first entity and a second format associated with a second entity in response to receiving user login information from a user. The user device then determines whether the user is associated with the first entity or the second entity. In response to determining which entity the user is associated with, a first window is displayed in at least one of the first format and the second format within the graphical user interface. A user selection of at least one interaction is received, and in response to receiving the user selection, the selection is transmitted to a back-end server system and the user is navigated to a second window to complete the selected at least one interaction. In the second window within the graphical user interface, at least one of the first format and the second format is displayed based on the selected at least one interaction.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Figure 1:
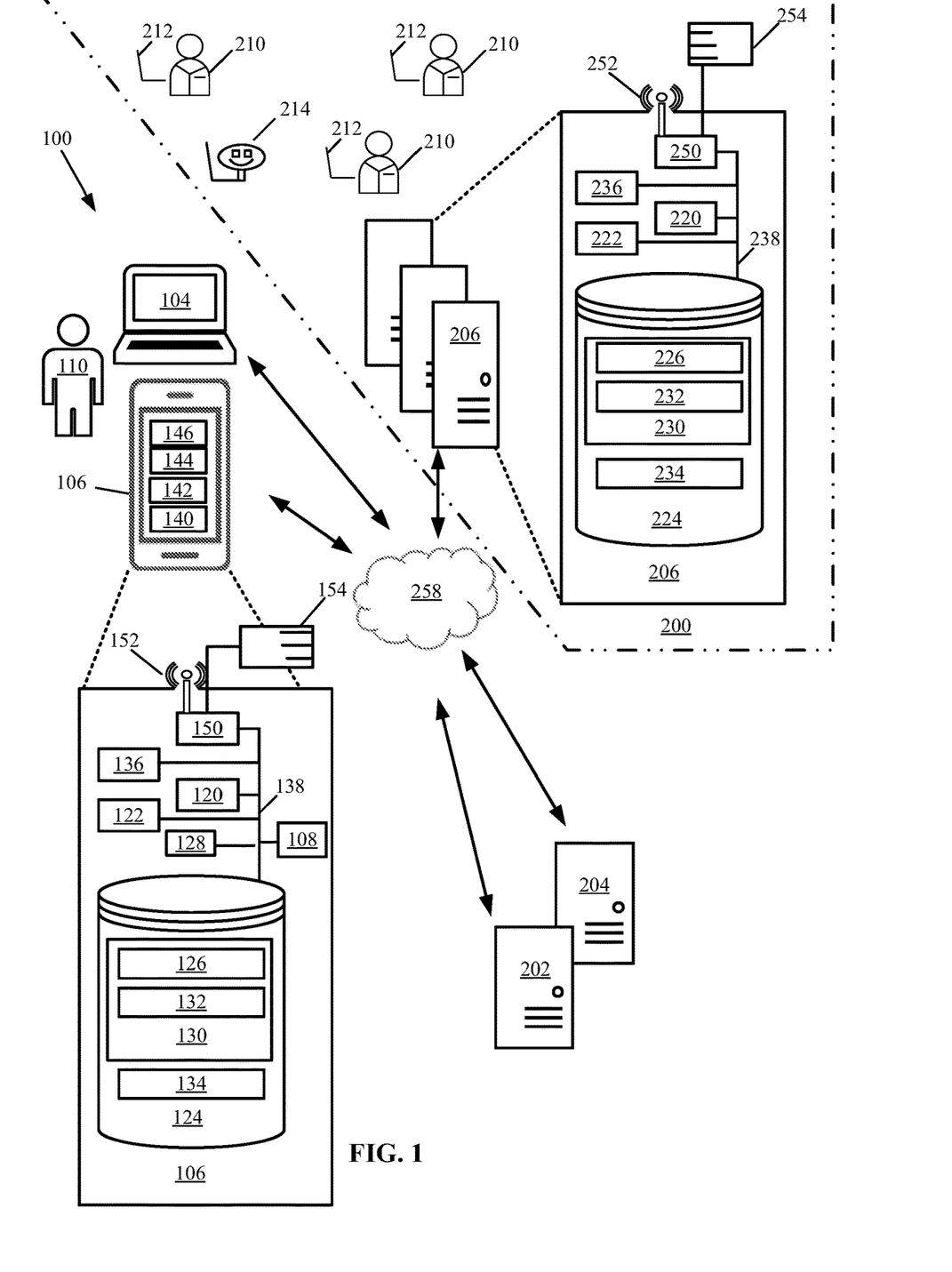
FIG. 1 illustrates an enterprise system and environment thereof for dynamically assigning a predetermined user experience to display in a graphical user interface, in accordance with an embodiment of the present invention.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be, for example, a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, a contactless communication device, and other transceivers. In addition, GPS (Global Positioning System) may be included for navigation and location-related data exchanges, ingoing and/or outgoing. Communications may also or alternatively be conducted via the connector 154 for wired connections such as by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may be utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the mobile device 104 and computing device 106, the agent devices 212, the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

Figure 2:
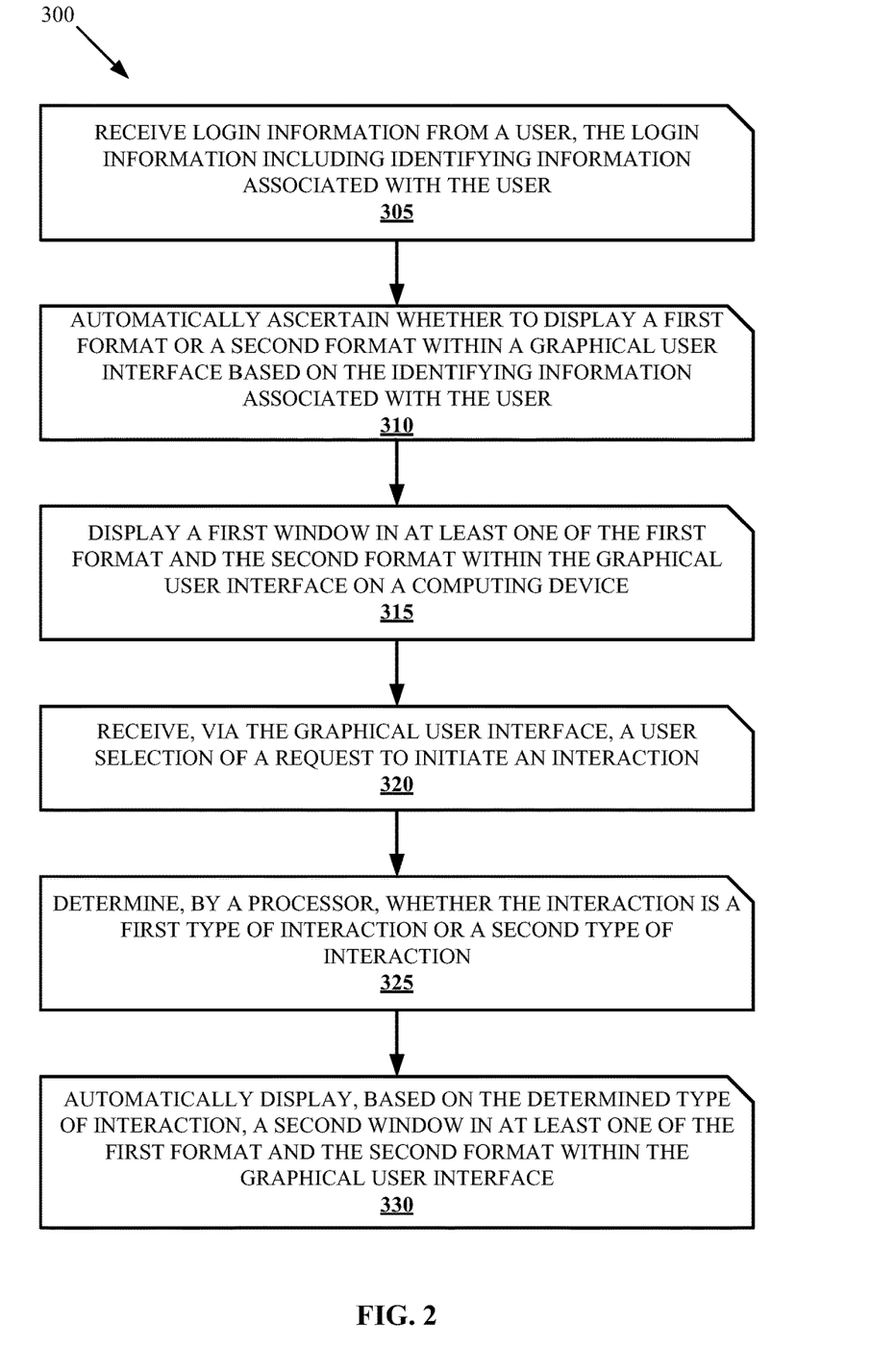
FIG. 2 is a flowchart illustrating a method for dynamically assigning a predetermined user experience to display in a graphical user interface, according to at least one embodiment.

FIG. 2 is a flow chart representing a method 300, according to at least one embodiment, for dynamically assigning a predetermined user experience displayed in a graphical user interface. The first step, as represented by block 305, is to receive login information from a user, where the login information includes identifying information associated with the user. In example embodiments, the login information may include a basic credentials such as username and password. In some embodiments, the login information may include advanced login credentials including biometric data, a personal identification number, and/or a two-step verification protocol for allowing a user to log in. In example embodiments, the identifying information associated with the user may include any one or more of the following identifiers for the user: (1) name; (2) phone number; (3) account number; (4) a code indicating which entity the user is a client with; and/or (5) other profile data.

In example embodiments, the login information is received with a request for remote user access to the user account from a user device over the Internet. The login information may be received after a back-end server system initiates a request or from the web-based browser based on directions from the online banking platform (which may come from a back-end server system or another entity system), or may originate from the dedicated mobile app. The login information may be received after the user is presented a pop-up window or online with the application or web-site content. The system may also receive the login information in response to a user attempting to navigate to information, such as account information, that is confidential and is only disclosed upon basic user authentication. In some embodiments, the login information may include a secondary level of authentication, or two-factor authentication, in addition to the basic username and password. For example, the system, upon receipt of the basic login information, may send a one-time code to the user's mobile device that must be input from the user device into the web-based browser or dedicated mobile application to gain full access to the user's account(s).

In various embodiments, once the login information has been received, the system will verify and authenticate the login information. The back-end server system may determine whether the submitted login information is sufficient to authenticate the user for remote access. If so, the system will generate and transmit a user authentication confirmation over the Internet to the user device to grant remote user access to the user device.

In example embodiments, the identifying information may include that the user is a customer or client of a financial institution. In some embodiments, the user may be a customer or client of more than one financial institution, where the financial institutions are at least tangentially associated with one another. The identifying information may be stored in a user account or on a web-based browser or dedicated application having an access control platform. The user account is associated with an entity with which the user holds at least one account, product, or other relationship. The web-based browser may be navigated to a website for the entity. The dedicated application may be a mobile application downloaded from an app store or other application hub for mobile devices. In example embodiments, the user account may only be accessed after the basic or advanced credentials have been input and authorized by the access control platform.

The next step, as represented by block 310, is to automatically ascertain whether to display a first format or experience or a second format or experience within a graphical user interface based on the identifying information associated with the user. For example, where the user is a customer of a first entity, the first format may be associated with the first entity and therefore would be determined to be the correct format to display within the graphical user interface. Alternatively, the user may be a customer or client of a second entity, where the second format is associated with the second entity and displayed within the graphical user interface for those users. As a further example, a user may be a customer, client, or user of both the first entity and the second entity, and so which format to display is determined or automatically ascertained based on which entity the web-based browser or dedicated application is associated with that the user accesses to login. For example, if the first entity has a first mobile application with a first processing system and the second entity has a second mobile application with a separate processing system, and the user accesses the first entity's mobile application, it will be automatically ascertained that the first format should be displayed. The opposite is similarly true. In example embodiments, the first entity and the second entity have different and separate processing systems. In some embodiments, a third entity may be involved in the system, where the third entity has its own processing system.

In example embodiments, the first and second entities may be a financial institute or banking provider. For example, where the first and second entities are a bank, the user account associated with the first or second entity may include any of the following: a checking account, a savings account, a money market account, a certificate of deposit, a mortgage or other loan account, retirement account, brokerage account, or any other suitable account known now or later discovered or developed. In some embodiments, a user may hold two of the same type of account with the first and/or second entity. For example, the user may have a primary checking account with the first entity and a secondary checking account with the second entity. In other embodiments, the user account may be accessible by only one user, or may include a joint account. For example, a user may have a personal savings account and a joint savings account shared with a spouse, both associated with the first entity.

In various embodiments, the first entity may be a first financial institute and the second entity may be a second and separate financial institute. In some embodiments, the first entity is a first branch of the first financial institute and the second entity is a second branch of the first financial institute. In particular embodiments, the first entity may be a first division of a financial institute, such as a private banking division, and the second entity may be a second division of the same financial institute, such as an investment banking division. In alternate embodiments, the first and second entity may be any suitable entity for exchanging, trading, buying, or selling resources. For example, as opposed to a traditional banking entity, the first and second entity may include entities that are decentralized computing systems that allow users to have accounts for interactions or transactions using distributed ledger technology (i.e., cryptocurrency networks).

Next, at block 315, a first window is displayed in at least one of the first format and the second format within the graphical user interface on a computing device. For example, where it was dynamically determined that the first format should be displayed, the system would display the first format in the first window in the graphical user interface on a computing device that the user is utilizing. In example embodiments, the first format includes a first theme associated with a first entity. Similarly, the second format includes a second theme associated with a second entity. In example embodiments, the first window may be any suitable web-browser, dedicated application, webpage, web form, pop-up window, or a prompt. In example embodiments, the first and second formats may be any suitable website design including, but not limited to, static website, CMS or dynamic website, business website, or e-commerce website. In particular embodiments, the first and second formats may include any suitable webpage format, webpage language, and/or webpage programming language including, but not limited to, HTML, CSS, Javascript, SQL, Python, Java, PHP, Bootstrap, W3.CSS, C, C++, C#, React, R, jQuery, Django, TypeScript, Node.js, or MySQL. In some embodiments, the first window is a web API controlled or managed by a third-party. For example, the first format or experience may include an HTML Iframe experience and the second experience may include a dynamic webpage that shows the user's full account including options for bill payments, receipts, etc. In an alternate embodiment, the first or second format may be experienced as a new tab in a web-browser.

Continuing to the next step, as represented by block 320, a user selection of a request to initiate an interaction is received via the graphical user interface. For example, while viewing the first window, the user may see options that allow the user to navigate around the website and to initiate interactions or transactions using the first entity format or the second entity format as displayed on the graphical user interface. In example embodiments, the interaction request may be for depositing a check, making a payment online, using a debit or credit card to make a purchase, making a loan payment, and/or making a wire or ACH transfer. In some embodiments, the interaction may further include a national or international electronic fund transfer, real-time gross settlement, immediate payment service, unified payments interface interactions, bank card interactions, and POS terminal interactions. In various embodiments, the interaction requested may simply be bill pay or a transfer of resources or funds from one account to a different account. In example embodiments, the transfer of resources or funds may include the transfer of any suitable resource, currency, or fund that may be transferred, exchanged, received, or purchased. For example, a user may have a first account with the first entity and may view the first format on the first window to navigate to a bill-pay page to initiate or set up bill-payment.

As represented by block 325, the next step is to determine, by a processor, whether the interaction is a first type of interaction or a second type of interaction. In example embodiments, the first and second types of interactions may be any suitable interaction, as described above. However, the various different types of interactions, like online bill-pay, includes underlying factors or parameters that allow the system, at block 330, to automatically display, based on the determined type of interaction, a second window in at least one of the first format and the second format within the graphical user interface. Thus, depending upon the type of interaction or transaction the user is requesting to initiate, either the first format will be displayed or the second format will be displayed in the second window. Similar to the first window, the second window may be any suitable web-browser window, dedicated application, webpage, web form, pop-up window, a prompt, or new browser tab. The system will display the first format or experience for a first set of interactions based on a first set of parameters and will display the second format for a second set of interactions based on a second and different set of parameters.

In one embodiment, the user experience may include accessing a website controlled by a first entity, entering login information into the website, and being directed to a webpage that has a first format or look once the system has granted the user remote access. The user may then select an option or link to a service offered by the first entity, such as online bill-pay. Once the link has been selected, and depending on the type of interaction that is associated with the link, a pop-up window may be displayed to allow the user to complete the requested interaction. The alternatives to this user experience may include any of the following: (1) first window displays the first format; second window displays the first format; (2) first window displays the first format; second window displays the second format; (3) first window displays the second format; second window displays the first format; or (4) first window displays the second format; second window displays the second format. In addition, as discussed above, the formats that are displayed in the first and second windows are predetermined based on parameters associated with the identifying information associated with the user and the type of interaction the user has requested to initiate.

Referring to FIG. 4, a flow chart representing a method 400, according to at least one embodiment, is disclosed for a user device that dynamically assigns a predetermined user experience that will be displayed in a graphical user interface. Many features of the user device or system that performs method 400 are the same or similar to those features recited above with regard to FIG. 2. Thus, for purposes of ease of understanding and clarity, only certain features will be discussed to highlight the differences in the systems and methods of the embodiment shown in FIG. 2 as compared to the embodiment shown in FIG. 3.

Figure 3:
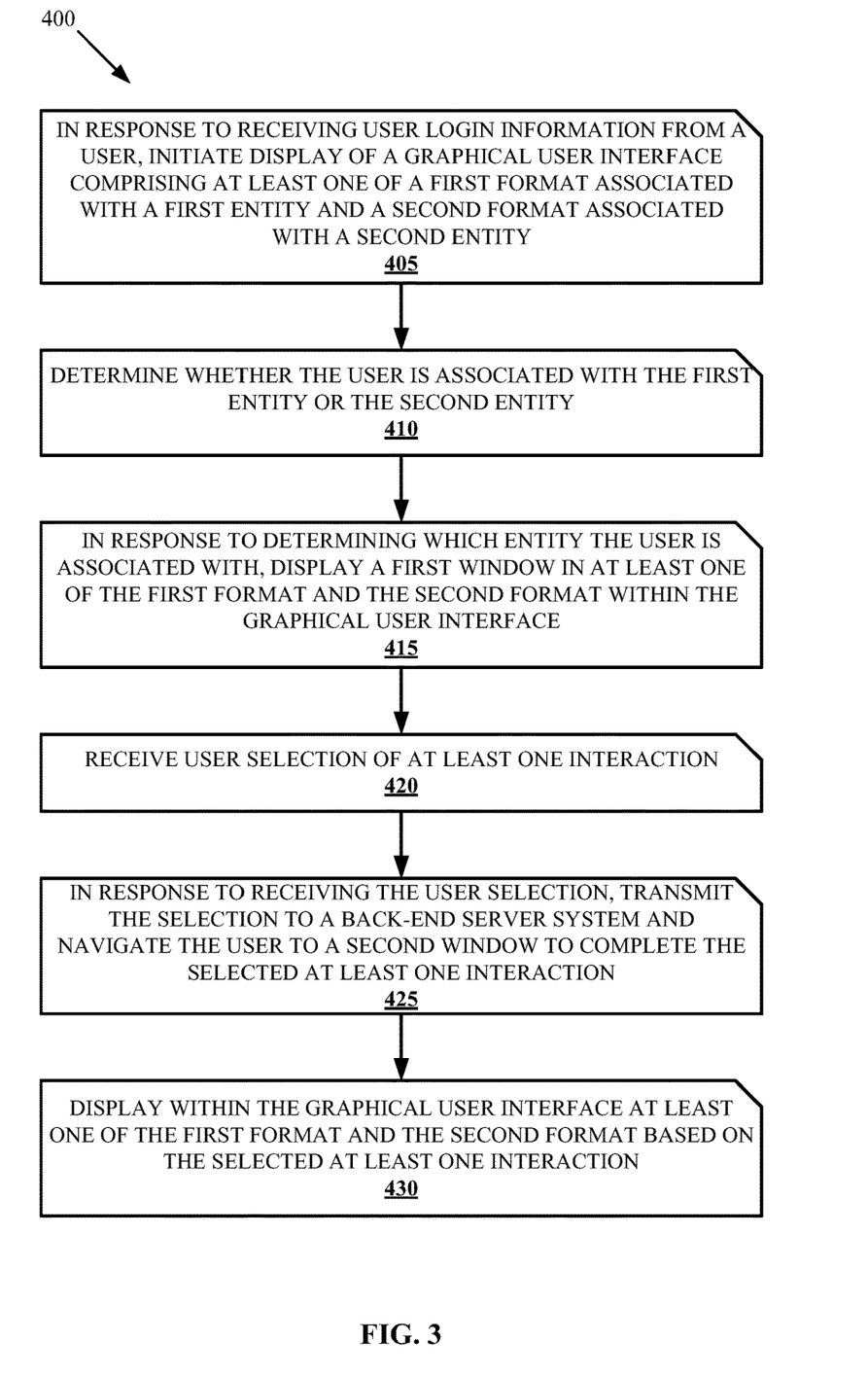
FIG. 3 is a flowchart illustrating a method for dynamically assigning a pre-selected user experience to display in a graphical user interface, according to at least one embodiment.

The first step, as represented by block 405, is to initiate display of a graphical user interface having at least one of a first format associated with a first entity and a second format associated with a second entity in response to receiving user login information from a user. In example embodiments, the system may display either the first or the second format.

Next, at block 410, the system determines whether the user is associated with the first entity or the second entity, and in response to determining which entity the user is associated with, displays a first window in at least one of the first format and the second format within the graphical user interface, as detailed in block 415. As discussed above, the format is predetermined based upon the login information associated with the user. Thus, if the user's login information is associated with the first entity, the system will display the first format. Similarly, if the user's login information is associated with the second entity, the system will display the second format.

Next, at block 420, the system receives a user selection of at least one interaction, and, at block 425, in response to receiving the user selection, the system transmits the selection to a back-end server system and navigates the user to a second window to complete the selected at least one interaction. When navigated to the second window, the format of the second window is predetermined based upon the type of interaction the user has selected. For example, if the user has selected a first type of interaction offered by the first entity, the second window will display the first format. Conversely, if the user has selected a second type of interaction offered by the second entity, the second window will display the second format. Thus, the first and the second window may display the same type of format or a different type of format.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A computer-implemented method for dynamically assigning a user experience displayed in a graphical user interface, the method comprising:
    receiving over the internet from a user device a request for remote access to stored account information for a user account;
    receiving, with the request, user login information from a user, the login information including identifying information associated with the user and the user account;
    determining, by a processor, whether the login information is associated with a first entity or a second entity;
    automatically ascertaining, by the processor, whether to display the stored account information in a first format associated with the first entity or a second format associated with the second entity within a graphical user interface based on whether the login information is determined to be associated with the first entity or the second entity;
    displaying the stored account information in a first window in at least one of the first format and the second format within the graphical user interface on the user device;
    receiving, via the graphical user interface, a user selection of a request to initiate an interaction;
    determining, by the processor, whether the interaction is a first type of interaction or a second type of interaction; and
    automatically displaying, based on the determined type of interaction, a second window in at least one of the first format and the second format within the graphical user interface.

2. The computer-implemented method of claim 1, wherein the identifying information associated with the user comprises information related to at least one account associated with either the first entity or the second entity.

3. The computer-implemented method of claim 1, wherein the first format comprises a first theme associated with the first entity.

4. The computer-implemented method of claim 1, wherein the second format comprises a second theme associated with the second entity.

5. The computer-implemented method of claim 3, wherein the first type of interaction comprises an interaction between the first entity and a third entity.

6. The computer-implemented method of claim 4, wherein the second type of interaction comprises an interaction between the second entity and a third entity.

7. The computer-implemented method of claim 1, wherein the first window comprises at least one of a window, a webpage, a web form, a pop-up window, and a prompt.

8. The computer-implemented method of claim 7, wherein the second window comprises at least one of a new window, a new webpage, a pop-up window, a prompt, and a new browser tab.

9. A system for dynamically assigning a user experience displayed in a graphical user interface, the system comprising:
- at least one processor;
- a communication interface communicatively coupled to the at least one processor;
- and a memory device storing executable code that, when executed, causes the processor to:
  - receive over the internet from a user device a request for remote access to stored account information from a user account;
  - receive, with the request, user login information from a user, the login information including identifying information associated with the user and the user account;
  - determine whether the login information is associated with a first entity or a second entity;
  - automatically ascertain whether to display the stored account information from a user account in a first format associated with the first entity or a second format associated with the second entity within a graphical user interface based on whether the login information is determined to be associated with the first entity or second entity;
  - display the account information in a first window in at least one of the first format and the second format within the graphical user interface on the user device;
  - receive, via the graphical user interface, a user selection of a request to initiate an interaction;
  - determine, by a processor, whether the interaction is a first type of interaction or a second type of interaction; and
  - automatically display, based on the determined type of interaction, a second window in at least one of the first format and the second format within the graphical user interface.

10. The system of claim 9, wherein the identifying information associated with the user comprises information related to at least one account associated with either the first entity or the second entity.

11. The system of claim 9, wherein the first format comprises a first theme associated with the first entity.

12. The system of claim 9, wherein the second format comprises a second theme associated with the second entity.

13. The system of claim 9, wherein the first type of interaction comprises an interaction between the first entity and a third entity.

14. The system of claim 9, wherein the second type of interaction comprises an interaction between the second entity and a third entity.

15. The system of claim 9, wherein the first window comprises at least one of a window, a webpage, a web form, a pop-up window, and a prompt.

16. The system of claim 9, wherein the second window comprises at least one of a new window, a new webpage, a pop-up window, a prompt, and a new browser tab.

17. A user device for dynamically assigning a predetermined user experience displayed in a graphical user interface, the user device comprising:
- at least one processor;
- a communication interface communicatively coupled to the at least one processor;
- and a memory device storing executable code that, when executed, causes the processor to:
  - in response to receiving user login information from a user, transmit the user login information with a request for remote access to stored account information for a user account, determine whether the user login information is associated with a first entity or a second entity, and initiate display of a graphical user interface comprising at least one of a first format associated with a first entity and a second format associated with a second entity;
  - in response to determining which entity the user login information is associated with, display a first window in at least one of the first format and the second format within the graphical user interface;
  - receive user selection of at least one interaction;
  - in response to receiving the user selection, transmit the selection to a back-end server system and navigate the user to a second window to complete the selected at least one interaction;
  - display within the graphical user interface at least one of the first format and the second format based on the selected at least one interaction.

18. The user device of claim 17, wherein the first window comprises at least one of a window, a webpage, a web form, a pop-up window, and a prompt.

19. The user device of claim 17, wherein the second window comprises at least one of a new window, a new webpage, a pop-up window, a prompt, and a new browser tab.

20. The user device of claim 17, where in the at least one interaction comprises at least one of bill pay, ACH transaction, and electronic fund transfer.

* * * * *